United States Patent [19]

Works

[11] 4,165,064
[45] Aug. 21, 1979

[54] GATE VALVE
[75] Inventor: Madden T. Works, Houston, Tex.
[73] Assignee: FIP, S.A. de C.V., Mexico
[21] Appl. No.: 886,259
[22] Filed: Mar. 13, 1978
[51] Int. Cl.² ................. F16K 27/04; F16K 27/10
[52] U.S. Cl. ................................. 251/329; 251/327
[58] Field of Search ............................. 251/329, 327

[56] References Cited
U.S. PATENT DOCUMENTS

| | | | |
|---|---|---|---|
| 2,904,306 | 9/1959 | Bryant | 251/329 X |
| 2,982,514 | 5/1961 | Bryant | 251/129 |

Primary Examiner—Arnold Rosenthal

[57] ABSTRACT

There is disclosed a gate valve having a gate movable within an elongated, rectangular section of a pressure containing body, and a hoop-like reinforcing flange disposed about the body section near one end thereof and arranged perpendicularly to the length of the body. Welds secure the inner edges of the flange welded to only intermediate portions of the long front walls of the body section, and bolts are provided for drawing together all four sides of the reinforcing flange and a mounting flange on a bonnet assembly. A reinforcing means connects the unsecured portions of the reinforcing flange to the front walls of the body section in such a manner as to have relatively high rigidity with respect to forces perpendicular to the reinforcing flange and relatively low rigidity with respect to forces which result from relative movement between the body and flange in directions generally parallel to the reinforcing flange.

6 Claims, 6 Drawing Figures

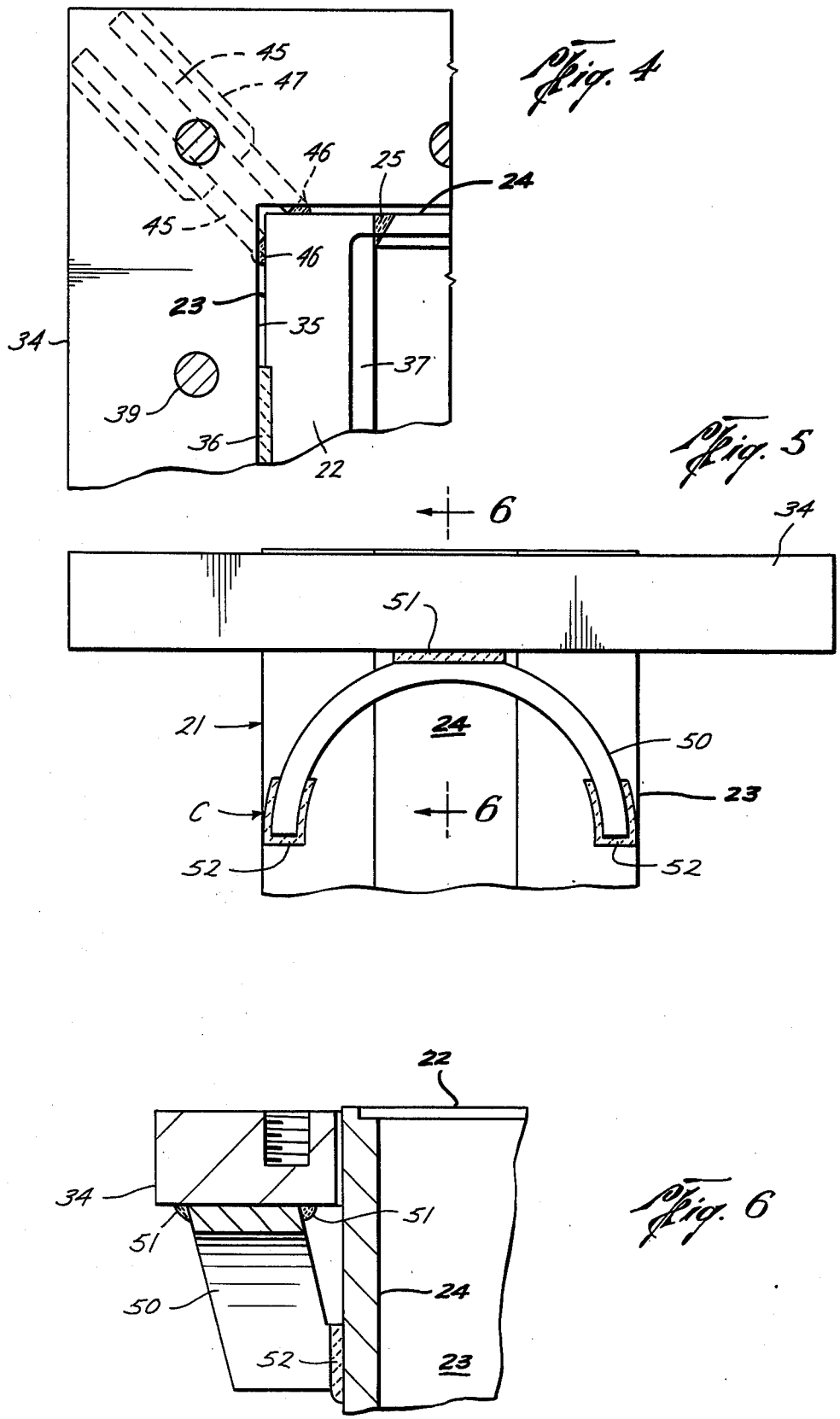

GATE VALVE

This invention relates generally to gate valves of the type having gates movable within a rectangular pressure containing section of the valve body by means of a stem connecting the gate to a bonnet assembly mounted on the outer end of the section, and wherein such section has one or more members welded thereto at spaced intervals along the body section in order to reinforce it against excessive bowing due to internal pressures within the valve. More particularly, it relates to improvements in such gate valves wherein one such member is a hoop-like flange secured to the body section near its open end and arranged perpendicularly thereof so as to provide a means to which a mounting flange on the bonnet assembly may be bolted.

In valves of this general type, the internal pressure within the body section causes its long, front walls to bow outwardly, and this in turn causes its short, side walls to bow inwardly. Hoop-like flanges have heretofore been disposed at spaced intervals about and secured to each body section to reinforce its walls against excessive bowing, and thus reduce stresses in the bodies. Critical stresses occur in the corners of the body section—i.e., at the intersection of their long, front walls and their short, side walls. Welding of the reinforcing flanges to the side walls of the body section merely adds to the tension in them and thus increases these stresses, by inhibiting free and unrestrained movement of the corners of the reinforcing flange and body section relative to one another. It was therefore proposed, in the valve shown in U.S. Pat. No. 2,904,306, that the inner edges of at least some of the hoop-like reinforcing flanges be welded to the body only along portions of the front walls thereof, thereby feeling the edges of the flanges of direct securement to the ends of the front walls at the corners and all of the side walls.

In the valve of U.S. Pat. No. 2,904,306, one of the reinforcing flanges is disposed near the end of the body section on which the bonnet assembly is disposed to provide a means by which a mounting flange near the adjacent end of the bonnet assembly may be bolted to the body. Obviously, the flanges must be maintained in a fairly rigid state, and their deflection limited, in order to permit the bolts to be tightened sufficiently to maintain a seal between the bonnet assembly and body section. Thus, in the valve of this patent, it was apparently thought necessary to weld the inner edges of the endmost reinforcing flange to all four walls of the body section, despite the increased stresses resulting from inhibiting free movement of the corners of the body and reinforcing flange in this manner.

The valve shown in U.S. Pat. No. 2,982,514 attempted to overcome these apparently irreconcilable considerations, by welding the edges of the endmost flange to the entire length of the front walls, but not the side walls, of the body section, and forming slots in the flange outwardly of the ends of the edges welded to the front walls of the body section. This formed so-called peninsulas inwardly of the slots for receiving bolts for connecting the reinforcing flange to a mounting flange near the adjacent end of the bonnet assembly. In this manner, it was apparently thought that stresses in the inside corners of the body section adjacent to the endmost reinforcing flange would be reduced, while deflection of such flanges upon tightening of bolts connecting with the peninsula would be lessened.

However, welding of the inner edges of the peninsulas to the ends of the front walls of the body section causes them to act as stiffeners, and thus to impose undesirable stresses in the short, side walls upon bowing of the front walls, by inhibiting free and unrestrained displacement of corners of the body relative to corners of the flange. Furthermore, the reinforcing flange of U.S. Pat. No. 2,982,514 provides no means by which its short sides opposite the side walls of the body section may be bolted to a mounting flange of a bonnet assembly.

It is therefore the principal object of the present invention to provide a valve of this type which overcomes the problems inherent in the above-described valves, and, in particular, which prevents excessive deflection of the endmost reinforcing flange thereof due to bolt loads, without, at the same time, increasing stress in the corners of the body section of the valve, as in the case of such prior valves.

Another object is to provide such a valve which is easy and inexpensive to manufacture in that it requires only a minor modification of the hoop-like reinforcing flange, and, further, which allows bolting of the reinforcing flange to the mounting flange of the bonnet assembly about all four of its sides.

These and other objects are accomplished, in accordance with the illustrated embodiment of the invention, by a valve which is similar to the first of those above described in that it has a hoop-like reinforcing flange disposed about and arranged perpendicularly to a rectangular body section near one end thereof, with the inner edges of the flange being welded to the rectangular body section only along intermediate portions of the front walls thereof. Consequently, since the edges at each corner and the edges opposite the side walls of the body are free of direct securement to the body section, the outer corners of the body and the inner corners of the flange are free to move relatively to one another. More particularly, a bonnet assembly is connected to the reinforcing flange by means of bolts for drawing all four sides of the reinforcing flange and a mounting flange on such assembly near the end of the bonnet assembly toward one another. However, in accordance with the novel aspect of this invention, excessive deflection, which might otherwise preclude tightening of the bolts, is prevented by means which connects the unsecured portions of the reinforcing flange to the front walls of the body section in such a manner as to have relatively high rigidity with respect to forces perpendicular to the reinforcing flange, such as bolt forces, but relatively low rigidity with respect to forces which result from relative movement between the body and flange in directions generally parallel to the reinforcing flange. Because of this novel arrangement, it is possible, and preferred, that bolts are effective in connecting the portions of the mounting flange and the reinforcing flange opposite the side walls of the body section. Thus, the reinforcing means is arranged to provide these relative rigidity characteristics in accordance with the principal object of this invention to avoid undue deflection of the reinforcing flange, and at the same time to avoid increasing stress in the corners of the body section of the valve.

In certain embodiments of the invention, the connecting means comprises gusset plate means extending generally diagonally of the corners of the body section and reinforcing flange and having their inner end welded to the front walls of the body section. In one such embodiment, the gusset plate means comprises a single gusset plate, while in another such embodiment, the gusset plate means comprises two or more generally parallel and spaced-apart gusset plates, each of which is thinner than the single plate so as to provide even lower rigidity to forces parallel to the flange. In either case, the disposal of the gusset plate means in a plane or planes generally parallel to the direction of bolt loading provides relatively high rigidity with respect to forces in a direction perpendicular to the flange. On the other hand, it provides relatively low rigidity with respect to forces parallel to the flange, as occur due to relative movement between the corners of the body and flanges.

In still another illustrated embodiment of the invention, the reinforcing means comprises an arcuate plate which has its midportion welded to a midportion of a short side of the reinforcing flange, and its end portions welded to the ends of the front walls of the body section. The arch provided by the arcuate plate has, of course, relatively high rigidity with respect to such perpendicular forces. On the other hand, due to the inherent flexibility of the plate in directions edgewise or from one end to the other, it has relatively low rigidity with respect to those forces resulting from free movement of the corners of the body and flange relative to one another.

In any event, the reinforcing means may take other forms and shapes, provided that, as in the case of those illustrated and described, it has relatively high rigidity with respect to forces perpendicular to the reinforcing flange, and relatively low rigidity with respect to forces which result from relative movement between the body and flange in directions parallel to the reinforcing flange.

In the drawings, wherein like reference characters are used throughout to designate like parts:

FIG. 4 is a partial horizontal sectional view of the valve, similar to the upper corner of FIG. 2, but showing in broken lines the second-described embodiment of reinforcing means;

FIG. 5 is a side view of the upper end of the body section and the reinforcing flange at one end thereof, together with an arcuate plate connecting the flange and to the ends of the front walls of the body section in accordance with the last-described embodiment of the invention; and FIG. 6 is a cross-sectional view of a portion of the body section and reinforcing flange, together with the arcuate plate connecting them, as seen along broken lines 6—6 of FIG. 5.

Figure 1:
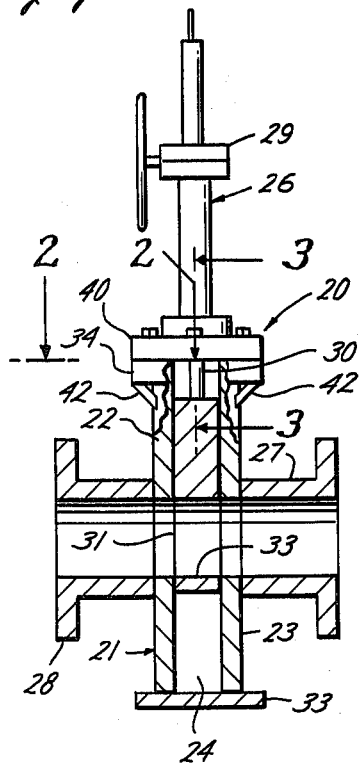
FIG. 1 is a side view of a valve constructed in accordance with the present invention, with a portion of the body thereof broken away to show the gate in an open position with respect to the pipeline connecting hubs on opposite front walls of the body.
Figure 2:
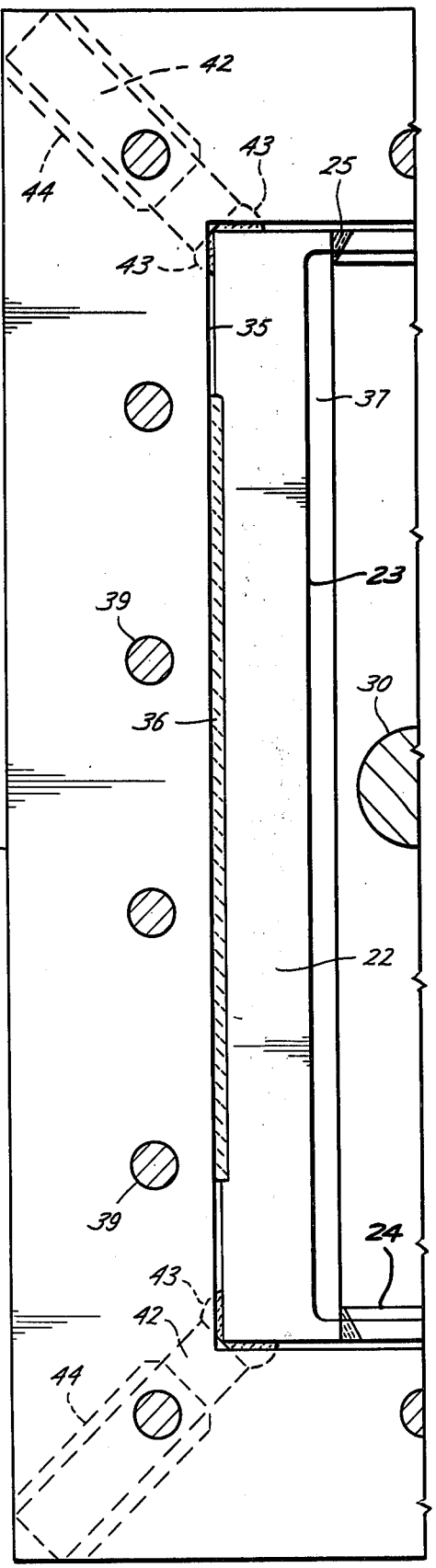
FIG. 2 is a horizontal sectional view of one side of the valve, as seen along broken lines 2—2 of FIG. 1, and showing in broken lines the first-described embodiment of reinforcing means connecting the reinforcing flange to the body section.

With reference now to the details of the above-described drawings, the overall valve shown in FIG. 1, and indicated in its entirety by reference character 20, comprises a body 21 which includes an elongated, generally rectangular section 22 having relatively thick, long front walls 23 welded to relatively thin, short side walls 24. More particularly, the front walls extend the full width of the rectangular section, and the opposite ends of the short side walls are welded to the inner surfaces thereof at 25, as shown in FIGS. 2 and 4, to form the four corners of the section. It will be understood, of course, that this particular rectangular body section construction is merely exemplary, and that, as shown in the prior art, the body may be made of plates of other shapes and sizes welded together in a different manner.

As shown in FIG. 1, axially aligned openings are formed in the front walls generally intermediate the upper and lower ends of the rectangular body section. The body 21 also includes pipe connecting hubs 27 mounted on the front walls, as by welding, and aligned with the openings in the front walls. Each such hub has a flange 28 or other means on its outer end for connection in a pipeline.

A bonnet assembly 26, which is mounted on the upper end of the rectangular section of the valve body 22, in a manner to be described more fully hereinafter, includes an operator 29 which may be handwheel operated and which is connected to a stem 30 on the upper end of a gate 31 for cooperation therewith in moving the gate between opened and closed positions with respect to the hubs. Thus, as shown diagrammatically in FIG. 1, the stem extends from the gate to the bonnet assembly through the open upper end of the valve body section and a sealed opening in a mounting plate 40 on the closed lower end of the bonnet assembly, all in a manner well known in the art.

In the illustrated embodiment of the invention, gate 31 has a conduit 33 therethrough which is adapted to be moved into and out of alignment with the aligned pipe connecting hubs 27. As shown, with the gate raised, its conduit 33 is aligned with these openings so as to open the valve. However, since the rectangular extension of the valve body extends both above and below the hubs, the gate is free to be moved downwardly to a closed position upon manipulation of the operator 29 of the bonnet assembly.

The lower end of the rectangular body section is closed by means of a bottom flange 32 welded or otherwise secured about all four walls thereof. Preferably, the flange extends outwardly from the side and front walls to provide a convenient support for the valve body.

As previously mentioned, a hoop-like reinforcing flange 34 has a rectangular opening 35 therein which is disposed about the rectangular body section near its upper end and thus near the mounting flange 40 of bonnet assembly 26. More particularly, flange 34 is arranged perpendicularly of the front and side walls of the body section so that with the latter arranged vertically, the upper and lower faces of flange 34 lie in substantially horizontal planes.

As best shown in FIG. 2, the opening 35 through flange 34 fits rather closely about the upper end of the rectangular section, and the intermediate portions of the long sides of the inner edges of such opening are directly secured to the front walls of the body section by welds 36. Thus, as previously described, inner corners, as well as all of the side edges of the flange 34 opposite the side walls of the rectangular section, are free of direct securement to the body section.

The upper end of each of the front and side walls of the body section is recessed adjacent its inner edge so as to form a continuous ledge 37 about the upper end of the rectangular body section. As will be described more fully hereinafter, a seal ring 38 is received on this ledge so as to form a seal between the rectangular body section and the lower end of the bonnet assembly when the latter is connected to the body section.

As also previously described, the bonnet assembly is connected to the reinforcing flange 34, and thus to the rectangular body section, by means of bolts 39 extending through holes in the mounting flange 40 and into threaded bolt holes 40a in the reinforcing flange, so as to permit them to be tightened in order to draw the reinforcing and mounting flanges toward one another. As shown, when the bolts have been tightened, the upper face of the reinforcing flange stands off a short distance from the lower face of the overhanging portion of mounting flanges 40 so as to insure engagement of the lower face of the mounting flange with the upper end of the body section in order to compress seal ring 38 between the body and the bonnet assembly. In well known fashion, the mounting flange has an opening through which the stem 30 of the gate sealably extends as it is moved by the operator 29.

Figure 3:
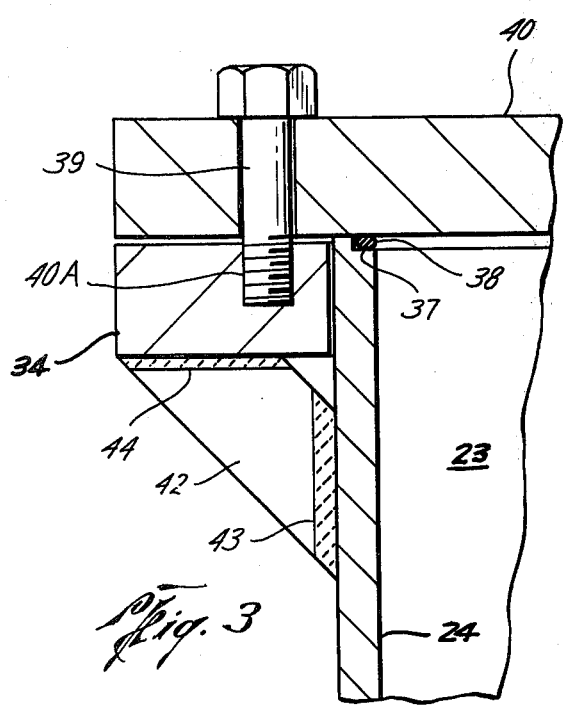
FIG. 3 is a partial vertical sectional view of the valve, as seen along broken lines 3—3 of FIG. 1, and showing the bolted connection of the mounting flange on the bonnet assembly to the reinforcing flange on the upper end of the valve body.

As best shown in FIGS. 3 and 4, bolts 39 connect the mounting flange and reinforcing flange not only along the intermediate portion of the reinforcing flange secured to the front walls of the rectangular body section, but also along unsecured portions thereof opposite the ends of the front walls, and thus the corners of each, and all of the side walls of such section. Thus, as best shown in FIG. 2, such bolts extend through the flanges opposite the corners of the body section as well as along the sides of the flanges opposite the side walls of the body section and intermediate the corner bolts.

As previously described, if the unsecured portions of the reinforcing flange 34 were to deflect excessively, they might not permit the bolts 39 to be tightened sufficiently to cause the seal ring 38 to seal between the body section and mounting flange. To prevent any such undue deflection, these unsecured portions of the reinforcing flange are reinforced by means which connects them to the front walls of the valve body section, and, although this application illustrates three such embodiments of such reinforcing means, it will be understood that other embodiments may take other shapes and forms having in common that they are so arranged and disposed as to have relatively high rigidity with respect to forces perpendicular to the reinforcing flange, as are induced by tightening of the bolts, and relatively low rigidity with respect to forces which result from relative movement between the body and flange in directions parallel to such flange, as are induced by relative movement of the corners of the body section and reinforcing flange upon bowing of the front and side walls of the body section due to internal pressures within the body.

As shown in FIGS. 1 to 3, this reinforcing means may comprise a single, vertically disposed gusset plate 42 extending generally diagonally of the corners of the rectangular body section and reinforcing flange. The inner end of the gusset plate is welded at 43 to the front wall of the body section on each side of the corner thereof, and the side edges of its upper end are welded at 44 to the lower face of the flange of the reinforcing flange 34 outwardly of the inner corner of the flange.

As previously described, since gusset plate 42 is disposed generally in a vertical plane, it provides high rigidity with respect to forces perpendicular to the flange, as are induced upon tightening of the bolts about the unsecured portions of the flange. On the other hand, since the gusset plate 42 is relatively thin, it has relatively low rigidity with respect to forces due to relative movement between the body and flange in directions parallel to the flange and thus in a generally horizontal direction.

Since all four sides of reinforcing flange 34 are of substantially equal width, gusset plate 42 extends at approximately 45° to the direction of each of its sides. Obviously, however, the sides may vary in width, if, for example, the horizontal forces make it preferable that the plates be disposed in other angular dispositions, but still extend generally diagonally of the corners. In any event, the gusset plate should not extend in a direction parallel to either flange side, but rather angularly with respect to both, and preferably substantially diagonally of the corners.

The embodiment of the valve illustrated in FIG. 4 is identical to that of FIGS. 1 to 3, except that the gusset plate means reinforcing the unsecured portions of the reinforcing flange 34 is instead made up of a pair of gusset plates 45 which are generally parallel and spaced apart. Similarly to gusset plate 42, plates 45 are disposed vertically and extend generally diagonally of the corners of the rectangular body section and reinforcing flange, with the inner end of each being secured to the front wall of the body section and the outer end thereof being secured to the lower face of the reinforcing flange.

Thus, from the side, the pair of gusset plates 45 would appear much like the gusset plate 42 shown in FIG. 3. As shown in FIG. 4, the inner ends of gusset plates 45 are square and welded to the ends and sides of the front walls of the body section by means of welds 46. The side edges of gusset plate 45 adjacent their upper ends are welded to the lower face of the reinforcing flange 34 by means of welds 47.

Although this latter embodiment of reinforcing means is very similar to the embodiment shown in FIGS. 1 to 3, it may have some advantage in the event that even less rigidity is desired with respect to forces resulting from relative movement between the body section and flange in directions parallel to the reinforcing flange. Thus, formation of the gusset plate means from two such gusset plates 45, end of which is of substantially one-half the thickness of the single gusset plate 42, will provide this lower rigidity, without sacrificing the relatively high rigidity with respect to forces perpendicular to the flange.

As in the case of the embodiment of FIG. 4, the valve which is shown in part in FIGS. 5 and 6 is identical to that of FIGS. 1 to 3, except for the reinforcing means connecting unsecured portions of the reinforcing flange 34 to the rectangular body section. Thus, such means comprises an arcuate plate 50 which is arranged as an arch to dispose its midportion adjacent the midportion of the side of the reinforcing flange opposite the midportion of the side wall of the rectangular body section, and its opposite ends adjacent the ends of the side walls 23 of the body section below such flange. When so disposed, the inner and outer edges of the arched upper end of the midportion of the reinforcing flange are welded at 51 to the lower face of the reinforcing flange, and the opposite ends of such plate are welded to the ends of the long, front walls, by means of U-shaped welds 52 along their sides and lower ends.

Plate 50 is relatively thin and so formed that, as shown in FIG. 6, its front and rear ends slant downwardly and inwardly toward the body section so as to provide the plate, as seen from the side (FIG. 6), with a somewhat L-shape. This permits the arched midportion thereof to be welded to the lower face of the reinforcing flange outwardly of the oppositely facing side walls of the body section, and the side edges of its lower end to be disposed against and welded to the ends of the front walls.

As previously described, with the plate arranged in this manner, its arch provides relatively high rigidity with respect to forces due to bolt loading and thus acting perpendicularly to the reinforcing flange. On the other hand, since the plate is relatively thin, the ends of the arch are relatively free to be moved toward and away from one another by means of horizontal forces, and the center of the arch is relatively free in a direction perpendicular to the side wall of the body section, so that the arcuate plate has relatively low rigidity with respect to forces induced by relative movement between the body and flange in a generally horizontal plane.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A gate valve, comprising a body including an elongated, generally rectangular section whose front walls are longer than its side walls, and aligned pipe connecting hubs mounted on the front walls, a bonnet assembly on one end of the rectangular section, a gate having a stem cooperable with the bonnet assembly for moving the gate between opened and closed positions with respect to the hubs, a hoop-like reinforcing flange having a rectangular opening therein disposed about the rectangular body section near the bonnet assembly and arranged perpendicularly thereto, welds securing the inner edges of the flange only to intermediate portions of the front walls of the body section, means connecting the bonnet assembly to the reinforcing flange, including a mounting flange near the end of the bonnet assembly and having an opening through which the stem extends, bolts for drawing together the mounting flange and the reinforcing flange, including portions thereof which are free of securement to said body section, and reinforcing means connecting the unsecured portions of the reinforcing flange to the front walls of the body section in such a manner as to have relatively high rigidity with respect to forces perpendicular to the reinforcing flange and relatively low rigidity with respect to forces which result from relative movement between the body and flange in directions generally parallel to the reinforcing flange.

2. A gate valve of the character defined in claim 1, wherein said bolts include bolts for drawing the mounting flange and portions of the reinforcing flange opposite the side walls of the body toward one another.

3. A gate valve of the character defined in claim 1, wherein the reinforcing means comprises gusset plate means extending generally diagonally of the corners of the rectangular body section and reinforcing flange.

4. A gate valve of the character defined in claim 3, wherein the gusset plate means comprises a single gusset plate.

5. A gate valve of the character defined in claim 3, wherein the gusset plate means comprises a plurality of generally parallel, spaced-apart gusset plates.

6. A gate valve of the character defined in claim 1, wherein said last-mentioned connecting means comprises an arcuate plate having its midportion welded to the reinforcing flange opposite the adjacent side wall of the body and its end portions welded to the ends of the front walls of the body section.

* * * * *